United States Patent
Moreno

(10) Patent No.: US 8,007,364 B2
(45) Date of Patent: Aug. 30, 2011

(54) METHOD OF DEVELOPING THE ACTIVITY OF AN ON-LINE GAME SITE

(75) Inventor: Roland Moreno, Paris (FR)

(73) Assignee: Innovatron, Paris (FR)

( * ) Notice: Subject to any disclaimer, the term of this patent is extended or adjusted under 35 U.S.C. 154(b) by 986 days.

(21) Appl. No.: 11/907,814

(22) Filed: Oct. 17, 2007

(65) Prior Publication Data
US 2008/0293485 A1 Nov. 27, 2008

Related U.S. Application Data

(63) Continuation-in-part of application No. 11/802,774, filed on May 24, 2007, now Pat. No. 7,896,744.

(51) Int. Cl.
*G06F 17/00* (2006.01)
(52) U.S. Cl. .......................................... 463/42
(58) Field of Classification Search .............. 463/40–42; 705/14; 273/430–432
See application file for complete search history.

(56) References Cited

U.S. PATENT DOCUMENTS

| | | | | |
|---|---|---|---|---|
| 6,447,397 | B1 * | 9/2002 | Jaeger et al. | 464/37 |
| 7,244,180 | B2 * | 7/2007 | McHugh | 463/40 |
| 2002/0042293 | A1 * | 4/2002 | Ubale et al. | 463/9 |
| 2007/0033107 | A1 * | 2/2007 | Ubale et al. | 705/14 |

* cited by examiner

*Primary Examiner* — Ronald Laneau
*(74) Attorney, Agent, or Firm* — Jacobson Holman PLLC

(57) ABSTRACT

An on-line game site involves a question engine coupled with a plurality of terminals controlled by respective players, for (i) sending predefined questions to the players, receiving answers to the questions from the players, and awarding prizes to the players over a given period of time as a function of the answers received, an activity measured by a traffic index representative of the number of players that have played the game over a given time interval, (ii) displaying, together with the questions sent to the players, paid-for advertising insertions, established on the base of a given rate, (iii) evaluating the receipts associated with the paid-for advertising insertions, (iv) establishing an endowment for the prizes to be awarded players over a given period of time, the endowment being a function of the level of the receipts, and (v) repeatedly increasing the endowment corresponding to an increase in the receipts resulting from an increase in the traffic index.

20 Claims, 2 Drawing Sheets

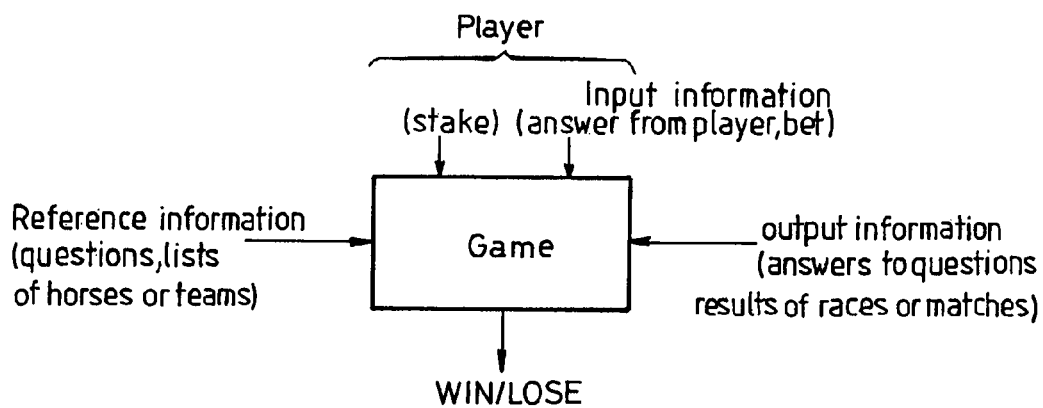
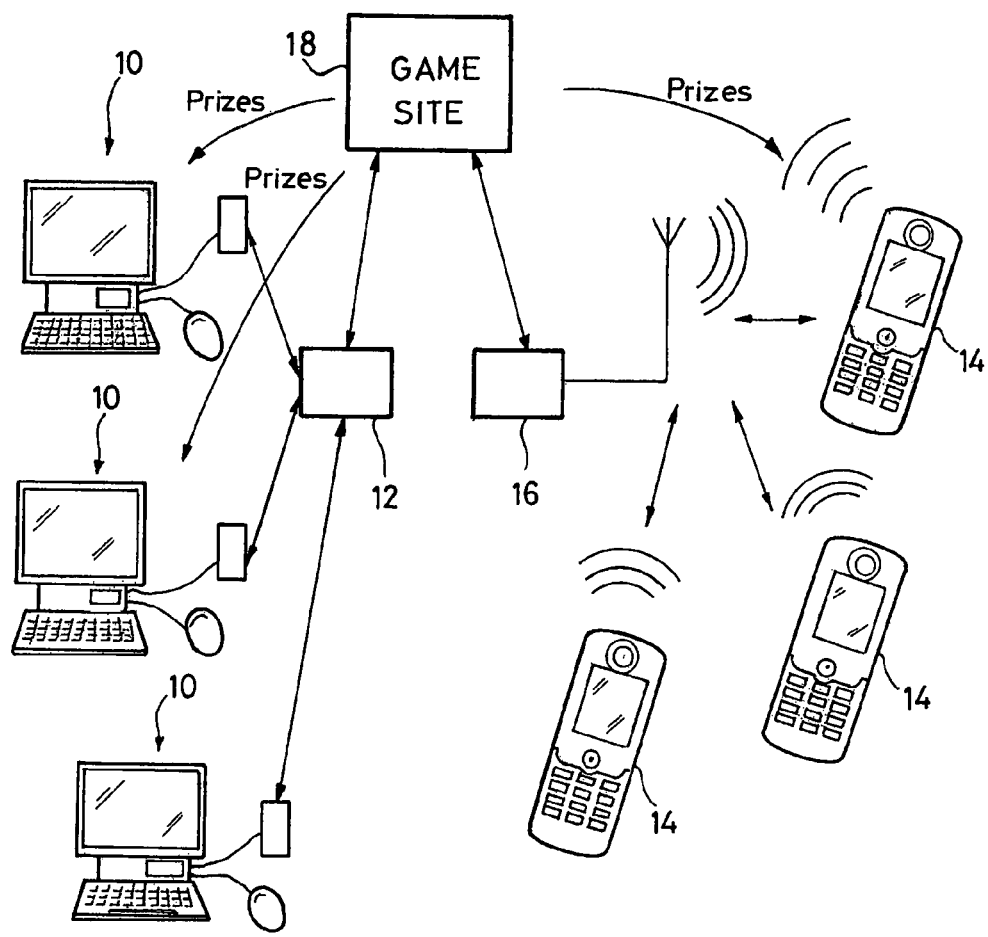

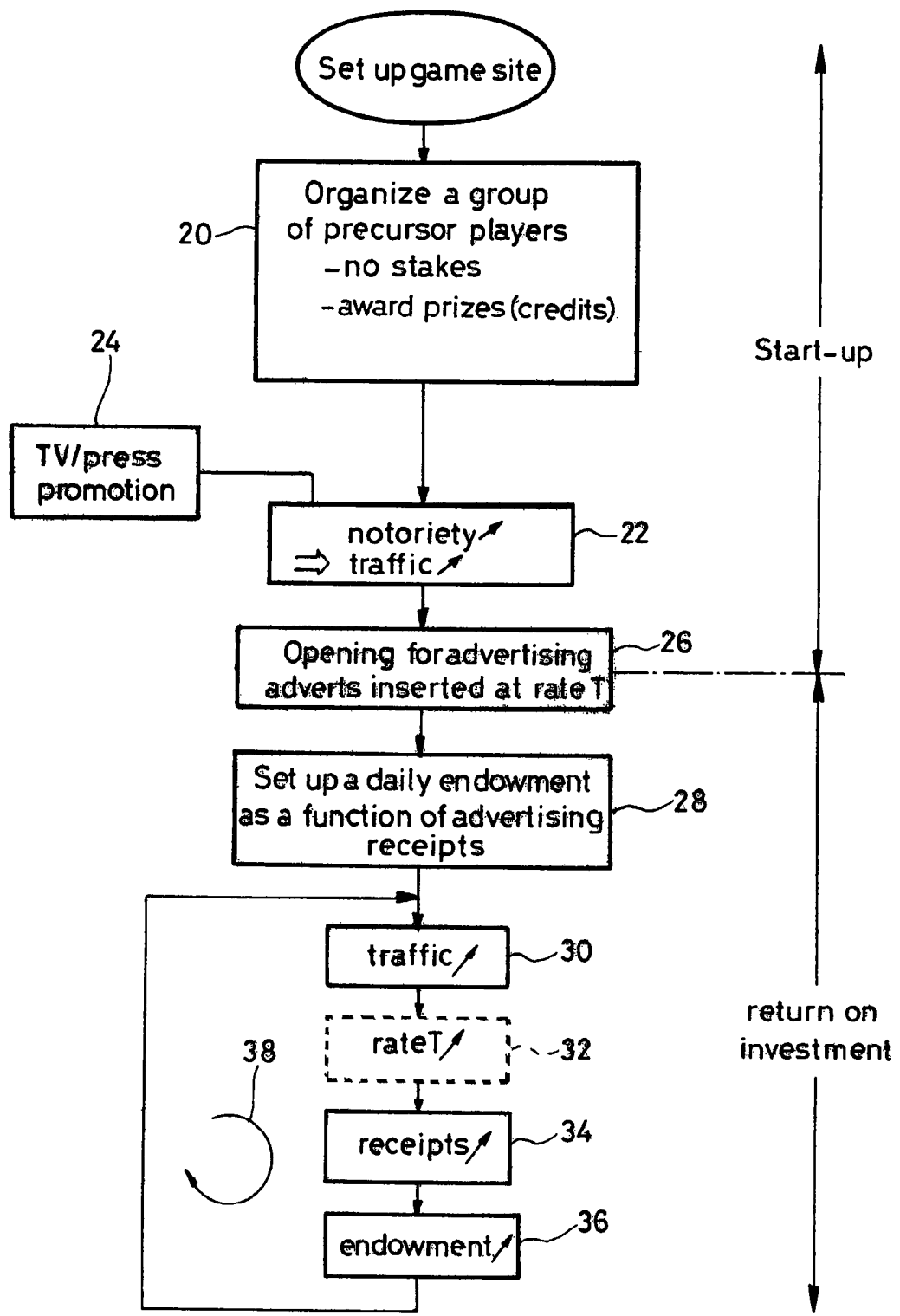

METHOD OF DEVELOPING THE ACTIVITY OF AN ON-LINE GAME SITE

This is a continuation-in-part of Ser. No. 11/802,774, filed May 24, 2007 now U.S. Pat. No. 7,896,744, the disclosure of which is incorporated herein by reference.

FIELD OF THE INVENTION

The invention relates to a method of developing the activity of an on-line game site, it being-understood that the term "game" should be understood very broadly, i.e. including:
- games of pure chance, such as lotto, casino games, etc.;
- games making use of a player's knowledge and shrewdness, such games possibly including a greater or smaller random contribution; and
- forecasting games in their various forms, whether relating to forthcoming events, or to events that have already occurred but for which the result is not yet known by the players.

DESCRIPTION OF THE RELATED TECHNIQUE

Copending applications U.S. Ser. No. 11/233,501 of Sep. 23, 2005 (Game based on combinations of words and implemented by a computer system), and U.S. Ser. No. 11/598,228 of Nov. 13, 2006 (Computer-implemented game based on combinations of words), both in the name of Moreno and the disclosures of which are incorporated herein; by reference, describe examples of on-line games involving the knowledge and shrewdness of players. For example; in application U.S. Ser. No. 11/598,229, starting from a starting word submitted by the site, the player sets out to find a series of additional words which, in combination with the starting word, maximize the number of occurrences of said combination of words when submitted to a search engine.

Copending applications U.S. Ser. No. 11/138,393 of May 27, 2005 (Computer-implemented question-and-answer game), and U.S. Ser. No. 11/808,137 of Jun. 6, 2007 (A method of developing the activity of an on-line forecasting site), both in the name of Moreno, and the disclosures of which are incorporated herein by reference, describe examples of on-line forecasting games. For example, in application U.S. Ser. No. 11/138,393, a answer taken from an opinion poll is submitted to the player, and instead of asking the player to give his or her own opinion as an answer to the question, the player is asked to guess the results obtained from the population polled, which results the player naturally does not know. In application U.S. Ser. No. 11/808,137, a player is asked, for example, to forecast the audience of a TV program, or tomorrow's weather, or indeed the results of sports events or of the stock exchange.

The dominant characteristic of presently-proposed on-line games is the need for a player to provide a stake in order to hope to obtain winnings, where the level of winnings is generally increased with increasing stake. Such games thus involve players taking a risk, and that only puts a brake on the development of the activity of the site, unless only small stakes are required, but then winnings are small, and player motivation is reduced. Games involving a purchase obligation or games reserved for individuals who have made a purchase or a subscription, etc. are considered as games requiring a monetary stake, since, in order to be allowed to play the game, players are involved with making a financial engagement equivalent to paying money.

There do indeed exists game sites that do not require players to pay stakes, however they are generally no more than entertainment sites, which recompense players only with honorific "points" (or perhaps encyclopedias or short holidays) without it being possible to obtain a tangible recompense in the form of a prize, a sum of money, a purchase voucher, etc.

One of the objects of the invention is to propose a method of developing the activity of a game site that provides a credible alternative to proposals that have been made in the past.

In particular, one of the objects of the invention is to propose a novel method which, without requiring the player to pay any stake whatsoever (or any purchase obligation or similar practice), nevertheless gives players the hope of concrete winnings.

Using such a method, another object of the invention is to develop amongst existing and potential players emulation that leads to a "virtuous circle", serving to increase the activity of the site, and correspondingly to increase both the advertising receipts and the attractiveness of the game.

Furthermore, a characteristic that is common to all of the games that have been proposed in the past, whether on-line or otherwise, lies in the fact that they all present binary type behavior, i.e. games "against the bank" or else games "against the players". The distinction between those two types of games lies in how winnings are allocated to players: in games "against the bank", it is the game organizer that receives the stakes from the players and that allocates the winnings (typical example: roulette), whereas in "games against the players", the player's stakes are pooled in a common pot, and the wining taken by the winner is paid by the other players (typical example: poker).

In this respect, another object of the invention is to propose a game of a new kind, which is neither a game "against the bank", nor a game "against the players", but a game in which all of the money won by the players comes from another source; as explained below, this source is constituted in particular by advertisers, such that the various games implemented in accordance with the teaching of the present invention could be said to be games "against the advertisers".

SUMMARY OF THE INVENTION

To this end, the invention provides a method of developing the activity of an on-line game site, the site comprising a question engine coupled with a plurality of terminals controlled by respective players, for sending questions to the players and for receiving answers from the players, said site awarding or not awarding prizes to the players as a function of the answers received. The activity of the site is measured by a traffic index representative of the number of players who have played the game over a given time interval. The method comprises:

a) displaying, together with the questions sent to the players, paid-for advertising insertions, established on the base of a given rate;

b) evaluating the receipts associated with said paid-for advertising insertions;

c) establishing an endowment for sharing amongst a plurality of prizes awardable over a given period of time, the endowments being a function of the level of said receipts;

d) increasing the receipts, and correspondingly said endowment, as a result in the increase in the traffic index; and e) continuing, and developing site activity by reiterating step d) above.

The game may be a game of chance, a game based on combinations of words, or a forecasting game.

The periodicity of the game is typically daily, however this period is not limiting in any way. The period may be longer (e.g. weekly or monthly), or shorter (e.g. once every hour, twice per day, . . . ); it may be unchanging and predetermined, or it may be variable. Apart from periodicity, the duration proper of a game session may also be limited, within the reference period (for example a game having a session duration of one hour with three game sessions being made available every day).

Advantageously, the method may include a prior stage of priming the site, comprising setting up a group of precursor players for whom the questions sent are displayed without advertising inserts, until an increase in the traffic index is detected above a given initial threshold, leading to a changeover to a stage of opening to advertising, including said display of paid-for advertising insertions together with the questions sent to the players.

Step d) may further comprise, on detecting an increase in the traffic-index above a given threshold, increasing at least one of the rate for insertions and the advertising space allocated to said insertions, possibly with auctioning of the rate and/or of the advertising space.

A preferred implementation of the invention involves a step of scoring the answers received from the various players, with a performance index being allocated as a function of the pertinence of the respective answers provided by the players.

In a first implementation, this scoring step comprises comparing the answer provided by a player with a battery of N criteria, and allocating or not allocating a partial score depending on whether the corresponding criterion is satisfied or not, the performance index being obtained by summing the N partial scores as allocated in this way. These criteria are preferably weighted, with each of the N criteria having a weight specific thereto for determining the corresponding partial score. The weights are also selected in such a manner that the probability of obtaining a zero performance index for any answer is less than a given minimum threshold, e.g. less than $1/100$, preferably less than $1/1000$.

In a second implementation, where the answer provided by the player comprises an ordered selection of n items representing the player's estimate of a reference answer known to the game site, the scoring step comprises comparing the answer provided by the player with said reference answer, and for each item calculating a partial score that is a function of said comparison, with the performance index being obtained by summing the n partial scores allocated in this way. The partial score for each item is advantageously calculated as a function of the difference between the rank of the item in the answer given by the player and the rank of the same item in the reference answer, and the function is preferably non-linear and degressive. This function may also be weighted by the rank of the item in the answer given by the player, with the weighting preferably being non-linear and degressive.

After the scoring step, there are steps of classifying the players as a function of their respective performance indices, and then of sharing the endowment between the N best-placed players. This sharing of the endowment is preferably non-uniform amongst the N players.

BRIEF DESCRIPTION OF THE DRAWINGS

There follows a more detailed description of a particular implementation of the invention, given with reference to the accompanying drawings.

FIG. 1 is a diagram showing the various parameters and pieces of information involved in defining and playing a game.

FIG. 2 is a diagram of a computer system enabling the invention to be implemented.

FIG. 3 is a flow chart showing the successive steps of the method of the invention.

DETAILED DESCRIPTION OF A PREFERRED INVENTION

Principle of the Game

As shown in FIG. 1, a game, in particular an on-line game, can be considered as an information system based on a plurality of pieces of information defined by the site or supplied by the player, with comparison between them determining winning or losing.

These pieces of information, which may be defined by chance to a greater or lesser extent or even entirely, comprise:

Reference information, e.g. specifying the problem to be solved by the player, the questions produced by a question engine, lists of horses, of sports teams, or of television programs, the successes of recently-released films or recently-published books/records, or of sports teams on which bets may be placed; in games of chance such as lotto, this reference information is constituted, for example, by a grid submitted to the player.

To simplify the description, this reference information, whatever its kind, is referred to as "questions", these questions being posed to a player by the game site.

Input information, supplied by the player; for example the answer a player proposes to the problem or to the questions, or a combination of horses (tierce, etc.), sports teams or television programs that the player hopes will win; in the example of a game of chance such as lotto, this input comprises the answers given by the player of the form: "I have"—or "I do not have"—"the number drawn by chance".

These various pieces of information, whatever their kind, are referred to below as "answers", the answers being supplied to the game site by the player.

Output information, originating from the site (real solution to the problem posed to the player, exact answers to the questions) or externally from the site (the results of races or of sports matches); in the example of lotto, this output information is made up of numbers drawn randomly, and presented to the various players.

And usually, also a stake requested of the player and corresponding to the risk the player is willing to accept in consideration for a hope of winning.

An essential characteristic of the invention is that the game selected for implementation does not require the player to place any stake.

Nevertheless, the player can be rewarded concretely by genuine prizes (sums of money, purchase vouchers, articles, etc.), i.e. prizes having monetary value and not just honorific points, after confronting tests, each of which can enable the player to win such a prize.

Implementation and Presentation of Questions and Answers

FIG. 2 shows a computer system enabling the invention to be implemented.

The invention may advantageously be implemented by means of an Internet site to which the player connects using a computer, however this implementation is not limiting in any way, and the invention can be implemented in other ways, providing there exist means for exchanging data in both directions and interactively between the player and a remote site, i.e. a games site organizing the running of the various steps of the method of the invention.

In particular, the invention can be implemented by means of mobile telephones or of personal digital assistants capable of exchanging data with the game site via a cell phone network, using various well-known technologies such as SMS, WAP, GPRS, UMTS-3G, etc.

The users of such networks can thus occupy idle moments (on public transport, in waiting rooms, etc.) by playing the game of the invention in the hope of wining prizes.

In FIG. 2, reference 10 designates microcomputers used by players. Each microcomputer 10 is connected to a telecommunications network which in this example is a terrestrial wired network such as the telephone network (in switched mode or in DSL mode), a cable distribution network, or indeed an Internet connection via a server common to a plurality of stations.

The game may also be implemented by cell phones 14 having functions that enable them to exchange digital data using various well-known technologies such as SMS, WAP, GPRS, or UMTS-3G.

The computer terminals 10 or telephones 14 are connected via respective appropriate interfaces 12, 16 to a game site 18 suitable of exchanging digital data with the terminals. Each terminal can display on a screen text messages, in particular information received from the game site 18, and the player can use a keyboard or keypad to input alphanumeric data and send it in return to the game site 18.

In this respect, the site 18 in co-operation with the interfaces 12 and 16, serves to format messages as a function of the type of terminal used: computer or telephone. Thus, for computer terminals 10, these messages are formatted so as to be received and displayed in the form of web pages readable using a browser, whereas for mobile telephones, messages are formatted as WAP pages for example, that are more suited for displaying on a screen of small size. Nevertheless, it should be observed that the content of the messages formatted by the game site 18 and by the interfaces 12 and 16, i.e. the information actually exchanged with the various terminals, is identical regardless of the formatting, and it is only the layout that changes depending on whether the information is to be displayed on computer terminals or on telephone terminals.

The various formats-mentioned above for presenting information are not limiting, and the same basic information can be presented to players in a variety of formats, from very small (screen of a portable telephone) to very large (giant display screen, e.g. in a TV studio); the difference lies only in the way the various pieces of information presented to the player are presented, with this presentation being adapted to the presentation media used.

The activity of the site is measured by a traffic index, representative of the number of players participating in the game over a given time interval, for example the number of different players connecting to the site during a given day.

It should be observed that the computer terminals 10 and telephone terminals 14 are not necessarily dedicated to one particular user. A single user may have both a computer terminal 10 and a telephone terminal 14 and can use either of them depending on circumstances, e.g. depending on whether the user is at home or away from home. The user merely needs to be identified to the site 18 by using a protocol, that is itself conventional, for inputting a specific address or telephone number, as appropriate, and then sending an identifier or subscriber number (login) and password.

Organization of the Game

She invention relies essentially on the following conjecture, formulated by the inventor of the present application: "If a player is offered a free game from which the player might win money, then the player will play".

The game of the invention is indeed free, insofar as no stake is required from the player.

Furthermore, participating in the game makes it almost certain that a player will win (how this is done is explained below), and will win prizes in the form of sums of money: the lure of winning can thus incite the least motivated of web users to participate in the game, without major difficulty.

The various stages of the process of developing the game site in accordance with the teaching of the invention are shown in FIG. 36.

Once the game site has been put into place, an information campaign draws web users to the site so as to constitute a group of "precursor players" (step 20) acting, during a first stage, to prime a "virtuous circle", i.e. the development of the site.

For example, the simultaneous launch of the same game on a television channel can incite a web user to go and play on the site, in particular because it is possible to make concrete winnings, specifically a sum of money, which characteristic will naturally be emphasized in the information campaign.

If the player is already a subscriber to the site, then the site will summit a new test to the player. Otherwise, the site will invite the player to subscribe, in a manner that is entirely conventional, by presenting a questionnaire to be filled in with an e-mail address, login, password, mobile telephone number, and a Captcha (registered trademark) type test to distinguish between a human user and a robot, etc. No stake will be requested of the player.

The player is then presented with a first test.

Amongst the very numerous games that can be envisaged in the context of the invention, the examples that are given below—and that present no limiting character—are selected for their simplicity and their ability to make it practically certain under all circumstances that players will have winnings, even if only modest, a situation that is likely to increase the interest in the game and thus the attractiveness of the site.

In these examples, access to the game site takes place via a gateway of the search engine type.

First Example of a Game and Characterization

This first example makes use of the propriety whereby a search engine knows, on the basis of its own statistics, which are the one hundred words (for example) that have given rise to the greatest number of requests during the preceding day (or the next day, or the present day, . . . ). Only the site knows the data and initially it is not publicly accessible, so it can therefore serve as a basis for the game.

Amongst these hundred words, ten of them are drawn at random and presented in arbitrary order to the web user.

The user is asked to classify the ten words in decreasing order, starting with the word the user believes to be present the most often in the hundred requests in question, and ending with the word the user estimates as being present the least often.

The user can be requested to make a classification amongst certain headings presented to the user, or indeed to select and/or classify three, four, or five headings amongst some larger number or proposed headings.

By way of example, the choices made available to the user may be presented in the form a grid with a series of boxes, and the user may be required to click on a box to make a choice.

In a variant, the questions and the way in which the answers are formulated can advantageously make use of a graphics interface so that the game can be played solely by operating the mouse in order to answer questions, without making use of the keyboard. By way of example, the ten words drawn at random are presented in arbitrary order on the screen, and the user answers by dragging the field corresponding to each word so as to make a stack of fields, the preferred word being the word at the top of the stack.

A button serves to validate the answer and send it to the game site. On the basis of this answer, the site determines a score that is displayed in return to the player.

Most advantageously, the score is calculated from a "characterization" of the answer, i.e. the answer is subjected to a battery of a very large number of different criteria, with some greater or lesser number of points being awarded to the player depending on whether such and such a criterion is satisfied.

Table 1 below an example of such a battery of criteria, together with the number of points associated with each.

TABLE 1

| | |
|---|---|
| one item in the right place | 3 points |
| two items in the right place | 5 points |
| three items in the right place | 7 points |
| four items in the right place | 11 points |
| five items in the right place | 13 points |
| four items in the right place including second place | 17 points |
| two items in order | 19 points |
| three items in order | 23 points |
| the winner | 29 points |
| the loser | 31 points |
| number two | 37 points |
| number three | 41 points |
| number four | 43 points |
| number four and number six | 47 points |
| number five and number three | 53 points |
| number six and number three | 59 points |
| a series of two items | 61 points |
| two series of two items | 97 points |
| three series of two items | 109 points |
| one series of three times | 113 points |
| two series of three items | 139 points |
| one series of four items | 181 points |
| one series of five items | 997 points |
| number one and number three | 71 points |
| number one and number four | 73 points |
| alternate items in the right and wrong places | 83 points |
| even rank items in the right place | 89 points |
| even rank items in the riqht place except 1 | 97 points |
| even rank items in the right place except 3 | 101 points |
| odd rank items in the right place | 103 points |
| items of rank that are multiples of 3 in the right place | 107 points |
| items of rank that are multiples of 3 in the right place except 1 . . . | 173 points |
| items of prime number rank in the right place | 359 points |
| items of prime number rank in the right place, except 1 | 269 points |
| items of [prime plus 1] rank in the right place except 2 | 157 points |
| numbers 3 and 5 in the right place | 127 points |
| number 4 in the right place | 401 points |
| number 5 in the right place | 419 points |

It is possible to imagine practically infinite variations of the various characterization criteria, for example:

"the items of odd rank are correctly placed";
"the items of first rank (except 7) are correctly placed";
"the items of rank that is a multiple of 11 (except the 3rd and 23rd) are correctly placed";
"the items prime number rank (except the 2nd, 10th, and 13th) are correctly placed";
"some multiples of 5 are correctly placed, but not all";
etc.

Most advantageously, in order to discourage cheats, the score sheet defined by Table 1 above (characterization table) is changed at regular intervals. This change may take place after each session (e.g. once a day), at least insofar as the number of points awarded for each criteria is modified, or preferably both the criteria and the number of points are modified.

These changes and variations make the characterization process particularly effective, and unpredictable for players, and thus practically impossible to defraud.

Second Example of a Game and Characterization

In this second example, the web user is asked to classify in decreasing order the names in a list that is submitted to the user by the game site.

For example the list may be the hundred most-famous names in global culture. These names may be selected in particular, for example, by defining 25 different categories, and by taking the four most-famous names in each category (or an average of four names).

By way of example, categories could be: musicians; artists; characters in films; trademarks; animals; etc.

Choosing a small number of names (four names) in a large number of categories (25 categories) makes it possible to end up with a list that is constituted by names known to practically all web users, and thus not requiring any particular erudition on the part of players. The game can thus be made accessible to a very large number of people, where the desired purpose is to address a population of potential players that is as large as possible.

Thus, with 4×25 names, there are $100!=100^{158}$ possible arrangements that could be submitted by players.

The probability of having two answers that are identical is thus practically zero, even with a very large population of players, thus making it possible, as explained below, to provide very fine discrimination between players even when they are very numerous.

On each new period of the game, e.g. each day, the search engine presents the player with a list, the list being different every day, and comprising 100 words selected from 25 different categories.

The list is modified every day; in addition, it is presented to players in a non-meaningful order, e.g. a random order, or else an order that is purely alphabetical.

The player is asked to classify the hundred words in the list in some given order, e.g. corresponding to the frequency of requests made using those words during the day in question.

This information is a future statistic, and cannot be known in advance by the player, so all the player can do is make an estimate.

At the end of the reference period, e.g. at the end of the day, the game site can establish the reference answer, i.e. the real classification of the various words in the list as a function of the number of requests presented to the search engine during the day that has just ended.

The response of each player is then submitted to a scoring procedure using the characterization and on the same principle as that set out above.

A first scoring possibility consists in applying a battery of criteria of the kind shown in Table 1 in the preceding example, i.e. analyzing the question and awarding a predetermined number of points depending on whether or not each particular criterion is satisfied (this table of points being established in unchanging and more or less arbitrary manner).

Another characterization possibility that is particularly advantageous with this second example consists in determining the number of points by applying a calculation formula to each answer (i.e. to the classification of each word in the list as estimated by the player), which formula serves to quantify the pertinence of the player's answer.

The calculation is performed for each item in the player's answer, i.e. for each word in the answer provided by the player.

Each item is characterized by its identifier (the word in question) and by its rank, i.e. by the position of the word as estimated by the player compared with the reference answer.

Very many formulae could be envisaged.

By way of example, the following formula could be used:

$$SCORE = \text{integral portion}\left[\frac{MAX\_POINTS}{REDUCING\_COEFF}\right]$$

$$REDUCING\_COEF = \frac{[(POSITION-1)/K_1 + 1^i]^{K_2}}{[DIFFERENCE/K'_1 + 1]^{K'_2}}$$

This formula gives a score (SCORE) to each item as a function of its position (POSITION) given by the player and the difference (DIFFERENCE) between said position (as estimated by the player) and the real position of the word (in the reference answer known only to the game site).

The above formula gives a score that increases with decreasing difference between the position estimated by the player and the real position of the item.

It also presents the advantage of introducing weighting as a function of the rank of the item in the answer provided by the player: for the same difference between the estimated answer and the real answer, the score reduction (REDUCING_COEF) is large for positions of small rank (close to the beginning of the list) and greater for a rank of large number (middle or end of the list). This makes it possible to concentrate the interest in the game on the beginning of the list, while the remainder of the list ensures that there is sufficient discrimination between players to be able to decide between them with certainty.

The coefficients $K_1$ and $K_2$ and $K'_1$ and $K'_2$ may be selected or adapted to vary the more or less degressive nature of the way in which the score is calculated.

The parameters $K_1$ and/or $K'_1$ serve to adjust the amount of degressiveness, i.e. the greater or smaller variation in the score for positions and/or differences that are the smallest ($K_1$ or $K'_1=1$ corresponds to a situation where the variation is linear). The parameters $K_2$ and $K'_2$ serve to adjust the slope of the variation as a function of the position and/or the difference, relative to a linear situation.

For example, if the following values are selected:
MAX_POINTS=1000
$K_1=20$; $K_2=2$
$K'_1=20$; $K'_2=6$, then still in the example of a list of 100 names, applying the above formula produces the matrix of Table 2 below in which each column gives the position of the item in the answer and each line corresponds to the value of the difference for that item between the reference answer and the answer as estimated by the player.

TABLE 2

|    | 1    | 2   | 3   | 4   | 5   | 6   | 7   | 8   | 9   | 10  | 11  | 12  | 13  | 14  | 15  | 16  | 17  | 18  | 19  | 20  |
|----|------|-----|-----|-----|-----|-----|-----|-----|-----|-----|-----|-----|-----|-----|-----|-----|-----|-----|-----|-----|
| 0  | 1000 | 907 | 826 | 756 | 694 | 640 | 591 | 548 | 510 | 475 | 444 | 416 | 390 | 367 | 346 | 326 | 308 | 292 | 277 | 262 |
| 1  | 746  | 676 | 616 | 564 | 510 | 477 | 441 | 409 | 380 | 354 | 331 | 310 | 291 | 274 | 258 | 243 | 230 | 218 | 206 | 196 |
| 2  | 564  | 511 | 466 | 426 | 391 | 361 | 334 | 309 | 287 | 268 | 250 | 234 | 220 | 207 | 195 | 184 | 174 | 164 | 156 | 148 |
| 3  | 432  | 392 | 357 | 326 | 300 | 276 | 255 | 237 | 220 | 205 | 192 | 179 | 160 | 158 | 149 | 141 | 133 | 126 | 119 | 113 |
| 4  | 334  | 303 | 276 | 253 | 232 | 214 | 198 | 183 | 170 | 159 | 148 | 139 | 130 | 123 | 115 | 109 | 103 | 97  | 92  | 88  |
| 5  | 262  | 237 | 216 | 198 | 182 | 167 | 155 | 143 | 133 | 124 | 116 | 109 | 102 | 96  | 90  | 85  | 80  | 76  | 72  | 68  |
| 6  | 207  | 187 | 171 | 156 | 143 | 132 | 122 | 113 | 105 | 98  | 92  | 86  | 80  | 76  | 71  | 67  | 63  | 60  | 57  | 54  |
| 7  | 165  | 149 | 136 | 124 | 114 | 105 | 97  | 90  | 84  | 78  | 73  | 68  | 64  | 60  | 57  | 53  | 50  | 40  | 45  | 43  |
| 8  | 132  | 120 | 109 | 100 | 92  | 84  | 78  | 72  | 67  | 63  | 59  | 55  | 51  | 48  | 45  | 43  | 40  | 30  | 36  | 34  |
| 9  | 107  | 97  | 88  | 81  | 74  | 68  | 63  | 59  | 54  | 51  | 47  | 44  | 42  | 39  | 37  | 35  | 33  | 31  | 29  | 28  |
| 10 | 87   | 79  | 72  | 66  | 68  | 56  | 51  | 48  | 44  | 41  | 39  | 36  | 34  | 32  | 30  | 28  | 27  | 25  | 24  | 23  |
| 11 | 72   | 65  | 59  | 54  | 50  | 46  | 42  | 39  | 36  | 34  | 32  | 30  | 28  | 26  | 24  | 23  | 22  | 21  | 19  | 18  |
| 12 | 59   | 54  | 49  | 45  | 41  | 38  | 35  | 32  | 30  | 28  | 26  | 24  | 23  | 21  | 20  | 19  | 18  | 17  | 16  | 15  |
| 13 | 49   | 44  | 40  | 37  | 34  | 31  | 29  | 27  | 25  | 23  | 22  | 20  | 19  | 18  | 17  | 16  | 15  | 14  | 13  | 13  |
| 14 | 41   | 37  | 34  | 31  | 28  | 26  | 24  | 22  | 21  | 19  | 18  | 17  | 16  | 15  | 14  | 13  | 12  | 12  | 11  | 10  |
| 15 | 34   | 31  | 28  | 26  | 24  | 22  | 20  | 19  | 17  | 16  | 15  | 14  | 13  | 12  | 12  | 11  | 10  | 10  | 9   | 9   |
| 16 | 29   | 26  | 24  | 22  | 20  | 18  | 17  | 16  | 15  | 13  | 13  | 12  | 11  | 10  | 10  | 9   | 9   | 8   | 8   | 7   |
| 17 | 24   | 22  | 20  | 18  | 17  | 15  | 14  | 13  | 12  | 11  | 11  | 10  | 9   | 9   | 8   | 8   | 7   | 7   | 6   | 6   |
| 18 | 21   | 19  | 17  | 16  | 14  | 13  | 12  | 11  | 10  | 10  | 9   | 8   | 8   | 7   | 7   | 6   | 6   | 6   | 5   | 5   |
| 19 | 18   | 16  | 15  | 13  | 12  | 11  | 10  | 9   | 9   | 8   | 8   | 7   | 7   | 6   | 6   | 5   | 5   | 5   | 5   | 4   |
| 20 | 15   | 14  | 12  | 11  | 10  | 10  | 9   | 8   | 7   | 7   | 6   | 6   | 6   | 5   | 5   | 5   | 4   | 4   | 4   | 4   |
| 21 | 13   | 12  | 11  | 10  | 9   | 8   | 7   | 7   | 6   | 6   | 5   | 5   | 5   | 4   | 4   | 4   | 4   | 3   | 3   | 3   |
| 22 | 11   | 10  | 9   | 8   | 8   | 7   | 6   | 6   | 5   | 5   | 5   | 4   | 4   | 4   | 4   | 3   | 3   | 3   | 3   | 3   |
| 23 | 10   | 9   | 8   | 7   | 7   | 6   | 5   | 5   | 5   | 4   | 4   | 4   | 3   | 3   | 3   | 3   | 3   | 2   | 2   | 2   |
| 24 | 8    | 7   | 7   | 6   | 6   | 5   | 5   | 4   | 4   | 4   | 3   | 3   | 3   | 3   | 3   | 2   | 2   | 2   | 2   | 2   |
| 25 | 7    | 6   | 6   | 5   | 5   | 4   | 4   | 4   | 3   | 3   | 3   | 3   | 2   | 2   | 2   | 2   | 2   | 2   | 2   | 2   |
| 26 | 6    | 6   | 5   | 5   | 4   | 4   | 3   | 3   | 3   | 3   | 2   | 2   | 2   | 2   | 2   | 2   | 2   | 1   | 1   | 1   |
| 27 | 5    | 5   | 4   | 4   | 4   | 3   | 3   | 3   | 3   | 2   | 2   | 2   | 2   | 2   | 2   | 1   | 1   | 1   | 1   | 1   |
| 28 | 5    | 4   | 4   | 3   | 3   | 3   | 3   | 2   | 2   | 2   | 2   | 2   | 1   | 1   | 1   | 1   | 1   | 1   | 1   | 1   |
| 29 | 4    | 4   | 3   | 3   | 3   | 2   | 2   | 2   | 2   | 2   | 2   | 1   | 1   | 1   | 1   | 1   | 1   | 1   | 1   | 1   |
| 30 | 4    | 3   | 3   | 3   | 2   | 2   | 2   | 2   | 2   | 1   | 1   | 1   | 1   | 1   | 1   | 1   | 1   | 1   | 1   | 1   |
| 31 | 3    | 3   | 3   | 2   | 2   | 2   | 2   | 1   | 1   | 1   | 1   | 1   | 1   | 1   | 1   | 1   | 1   | 1   |     |     |
| 32 | 3    | 2   | 2   | 2   | 2   | 2   | 1   | 1   | 1   | 1   | 1   | 1   | 1   | 1   | 1   | 1   |     |     |     |     |
| 33 | 2    | 2   | 2   | 2   | 2   | 1   | 1   | 1   | 1   | 1   | 1   | 1   | 1   |     |     |     |     |     |     |     |
| 34 | 2    | 2   | 2   | 1   | 1   | 1   | 1   | 1   | 1   | 1   | 1   | 1   |     |     |     |     |     |     |     |     |
| 35 | 2    | 2   | 1   | 1   | 1   | 1   | 1   | 1   | 1   | 1   |     |     |     |     |     |     |     |     |     |     |
| 36 | 2    | 1   | 1   | 1   | 1   | 1   | 1   | 1   |     |     |     |     |     |     |     |     |     |     |     |     |
| 37 | 1    | 1   | 1   | 1   | 1   | 1   | 1   | 1   |     |     |     |     |     |     |     |     |     |     |     |     |
| 38 | 1    | 1   | 1   | 1   | 1   | 1   |     |     |     |     |     |     |     |     |     |     |     |     |     |     |
| 39 | 1    | 1   | 1   | 1   | 1   |     |     |     |     |     |     |     |     |     |     |     |     |     |     |     |

TABLE 2-continued

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 40 | 1 | 1 | 1 | 1 | | | | | | | | | | | | | | | | |
| 41 | 1 | 1 | 1 | | | | | | | | | | | | | | | | | |
| 42 | 1 | 1 | | | | | | | | | | | | | | | | | | |
| 43 | 1 | | | | | | | | | | | | | | | | | | | |
| 44 | | | | | | | | | | | | | | | | | | | | |

Calculating the Final Score

In all cases, once the player has confirmed an answer and the characterization process has been applied thereto, the points corresponding to each criterion are added up to give the final score of the answer.

This method of calculating the score from a multitude of criteria in combination with the results of the criteria being summed presents two advantages:

the web user is certain to have scored some points; the probability of an answer not satisfying any of the criteria, not even those that have a very low performance index, is tiny; and the probability of identical scores being obtained for combinations that are different is very small (so the risk of ties is small), particularly when the number of criteria is large, and if the numbers of points allocated to the various criteria are suitably chosen, in particular by using values that are different and that present no or few common dividers.

In other words, this method of calculating the score with "characterization" (a technique that consists in applying a battery of weighted criteria to a given answer), makes it possible to quantify the performance of a player in playing the game with "graininess" that is very fine, i.e. with it being practically certain that all players will be awarded different scores even if there are very many players (i.e. small chance of ties).

It is thus possible to establish a hierarchy between the players, for use in a subsequent step that is described below.

The score obtained by a player, i.e. the player's quantified performance index, is converted into monetary units, so that after a few days the player will have accumulated a small sum, e.g. about $20, that can be paid to the player by any suitable means: a check in the mail, an electronic transfer to a bank or other account, credit on a telephone bill, etc.

Preferably, this amount is paid to the player by crediting an account held by the player with an on-line payment site such as Google Checkout and PayPal (registered trademarks), which are two of the best known examples of such payment sites. These sites are very well adapted to "micropayments", i.e. payments of small amounts, of a few dollars or even less than one dollar, amounts that cannot be paid by conventional bank transfers since the fees deducted by the bank would be disproportionate.

After accumulating small winnings in this way without paying any stake whatsoever, the player is bound to spread the word of this good fortune to web user friends, who will thus also make haste to play the game.

The notoriety and the traffic of the site will thus increase (step 22) to reach several tens or hundreds of thousands of players.

This threshold is sufficient to be of interest to advertisers (or indeed to make the traditional advertisers of the game accept an increase in rates for the space rented), who will then apply to the operator of the site to insert advertisements displayable on the screens presented to players.

These screens comprise i) a zone reserved for the game, and ii) a commercial zone. The question posed to the player is displayed in the game zone; an advertisement is displayed in the commercial zone, e.g. for a well-known trademark seeking to sponsor the game. The screen may be presented in the form of a set of advertising blocks (commercial zone) surrounding the game zone, the various advertising blocks possibly including a clickable link enabling the web user to go to the site of the advertiser.

Once the site is open for advertising (step 26), the site operators begin to earn money, in amounts that are considerably greater than the costs of running the site: thus begins a stage of return on investment following the priming stage.

The next step consists in setting up a periodic endowment, e.g. daily, as a function of advertising receipts (step 28).

The site then lets it be known that henceforth it will pay to players, e.g. 50% of its advertising receipts.

Classifying Players and Awarding Prizes

At regular intervals, e.g. once a day or once a week, web users who have played the game are classified as a function of the scores they have obtained, and prizes of monetary value are awarded to them as a function of a predetermined distribution key, e.g. as described by Table 3 below.

TABLE 3

| Rank | Winning | Per week | |
|---|---|---|---|
| 1 | 10,000 | 1 | 10,000 |
| 2 | 1,000 | | |
| 3 | 1,000 | | |
| 4 | 1,000 | | |
| 5 | 1,000 | | |
| 6 | 1,000 | | |
| 11 | 1,000 | 10 | 10,000 |
| 12 | 100 | | |
| | 100 | | |
| 13 | 100 | ... | |
| 14 | 100 | ... | |
| 111 | 100 | 100 | 10,000 |
| 112 | 10 | | |
| 113 | 10 | | |
| 1,111 | 10 | 1000 | 10,000 |
| 1,112 | 1 | | |
| 11,111 | 1 | 10,000 | 10,000 |
| 11,112 | 0 | | |

In other words, in this example, if the weekly advertising receipts amount to $100,000, for example, then the site pays out $50,000 per week, subdivided into 11,111 prizes, i.e. one prize of $10,000, ten prizes of $1000, 100 prizes of $100, 1000 prizes of $10, and 10,000 prizes of $1.

Still in this example, there will thus be each week 11,111 winners amongst the players who have played the game. Players numbered 11,112 and up are not winners, but—and this is a main characteristic of the invention—they are not losers since they have not paid any stakes, and therefore they have lost nothing, i.e. they are not poorer in any way.

The ease of the game and the hope of winning make it much more interesting to web users, who will throng to the site in daily-increasing numbers (step 30).

The increase in the number of players, and thus in the activity of the site, ipso facto leads to an increase in advertising receipts.

At this stage, the operator of the site may possibly increase advertising rates (rates for an insertion) and/or the amount of advertising space made available to advertisers. This increase (step 32), although optional, can be fully justified by the increase in traffic on the site, thus leading to greater exposure of the advertisements.

This increase in rates may be set by the operator of the site, or possibly by auction, using advertising techniques that are now well established and familiar to Internet operators, e.g. auctions of the Adword (trademark registered by Google Inc.) type, or the like.

From the above, it can be seen that it is an increase in receipts (step 34) and thus in the endowment that can be made available to players (step 36).

This increase in the endowment will itself-lead to a further increase in traffic, leading automatically to an increase in receipts, and so on, thus contributing to looping round a "virtuous circle" (represented by arrow 38) suitable for further increasing the activity of the game site.

Other variants can be made to the implementation described above. In general, in order to preserve the attractiveness of the site, it is nevertheless desirable to put a ceiling on the space and/or the time that advertising insertions are present.

The invention claimed is:

1. A method of developing the activity of an on-line game site, the site comprising a question engine coupled with a plurality of terminals including display screens accessible by respective players, for sending questions to the players and for receiving answers from the players, the site allocating or not allocating prizes to the players as a function of the answers received, the activity of the site being measured by a traffic index representative of the number of players who have played the game over a given time interval, the method comprising, in an advertising stage, the steps of:
   a) sending to the players, by the question engine, and displaying on the terminal screens, questions together with paid-for, at a given rate, advertising insertions;
   b) evaluating receipts associated with the paid-for advertising insertions;
   c) awarding the players prizes from an endowment, over a given period of time, the endowment being a function of the level of the receipts; and
   d) increasing the endowment, correspondingly, based on an increase in the level of receipts, when an increase in the traffic index is detected.

2. The method of claim 1, wherein the game is selected from the group consisting of games of chance, games based on combinations of words, and forecasting games.

3. The method of claim 1, wherein the advertising stage is preceded by site-priming stage comprising the step of sending to precursor players, by the question engine, and displaying on the terminal screens, questions without the advertising insertions, until an increase in the traffic index above a given initial threshold is detected, whereby the advertising stage begins.

4. The method of claim 1, wherein step d) further comprises, upon detecting an increase in the traffic index above a given threshold, increasing at least one of (i) the given rate for sending and displaying the advertising insertions and (ii) screen space allocated to the advertising insertions.

5. The method of claim 4, wherein auctioning effects increasing the at least one of (i) the given rate and (ii) the screen space.

6. The method of claim 1 further comprising the step of scoring the answers received from the players, with a performance index being allocated as a function of the pertinence of the respective answers provided by the players.

7. The method of claim 6, wherein the scoring step comprises comparing an answer provided by a player with a battery of N criteria and allocating a N partial score for each corresponding criterion of the N criteria satisfied by the answer, the performance index being allocated by summing the allocated N partial scores.

8. The method of claim 7, wherein each criterion of the N criteria is weighted, with a weight specific thereto, for determining the corresponding N partial score.

9. The method according to claim 7, wherein the N criteria are selected so that the probability of allocating a performance index of zero for any answer is less than a given minimum threshold.

10. The method of claim 9, wherein the N criteria are selected so that the probability of allocating a performance index of zero for any answer is less than $1/100$.

11. The method of claim 10, wherein the N criteria are selected so that the probability of allocating a performance index of zero for any answer is less than $1/1000$.

12. The method of claim 6, wherein the answer provided by the player comprises an ordered selection of n items representing the player's estimate of a reference answer known to the game site, and wherein the scoring step comprises (i) comparing the answer provided by the player with the reference answer and for each n item and (ii) calculating a n partial score that is a function of the comparison, with the performance index being allocated by summing the calculated n partial scores.

13. The method of claim 12, wherein the n partial score calculated for each n item is a function of the difference between the rank of the n item in the answer provided by the player and the rank of the same n item in the reference answer.

14. The method of claim 13, wherein the function is non-linear and degressive.

15. The method of claim 12, wherein the partial score for each n item is calculated as a function weighted by the rank of the n item in the answer provided by the player.

16. The method of claim 15, wherein the weighting of the function is non-linear and degressive.

17. The method of claim 6 further comprising, after the scoring step, the step of classifying players as a function of their representative performance indices.

18. The method of claim 17 further comprising, after the classification step, the step of sharing the endowment among the n best-placed players.

19. The method of claim 17, wherein the endowment sharing is non-uniform.

20. The method of claim 1, wherein the endowment is a predetermined percentage of the level of receipts evaluated over the given period of time.

* * * * *